US007392241B2

(12) United States Patent
Lin et al.

(10) Patent No.: US 7,392,241 B2
(45) Date of Patent: Jun. 24, 2008

(54) SEARCHING METHOD FOR A SECURITY POLICY DATABASE

(75) Inventors: Chin-Yi Lin, Douliou (TW); Koan-Sin Tan, Kaohsiung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 402 days.

(21) Appl. No.: 10/720,074

(22) Filed: Nov. 25, 2003

(65) Prior Publication Data

US 2005/0044068 A1 Feb. 24, 2005

(30) Foreign Application Priority Data

Aug. 22, 2003 (TW) .............. 92123183 A

(51) Int. Cl.
*G06F 17/30* (2006.01)
(52) U.S. Cl. ................. 707/3; 707/9; 709/225
(58) Field of Classification Search ........... 707/1–10, 707/100–104.1, 200–206; 709/225; 713/152, 713/164, 166; 726/1–2, 12
See application file for complete search history.

(56) References Cited

U.S. PATENT DOCUMENTS

| | | | | |
|---|---|---|---|---|
| 6,347,376 | B1 | 2/2002 | Attwood et al. ............... 726/1 |
| 6,505,192 | B1 * | 1/2003 | Godwin et al. ................. 707/3 |
| 6,715,081 | B1 * | 3/2004 | Attwood et al. ................ 707/3 |
| 6,754,832 | B1 * | 6/2004 | Godwin et al. ................ 726/14 |
| 6,988,106 | B2 * | 1/2006 | Enderwick et al. .......... 707/100 |
| 2003/0023846 | A1 | 1/2003 | Krishna et al. .............. 713/162 |
| 2003/0028585 | A1 * | 2/2003 | Yeager et al. ............... 709/201 |
| 2003/0061507 | A1 | 3/2003 | Xiong et al. .................... 726/4 |
| 2003/0069973 | A1 | 4/2003 | Ganesan et al. ............. 709/226 |
| 2004/0054807 | A1 * | 3/2004 | Harvey et al. ............... 709/243 |
| 2004/0093524 | A1 * | 5/2004 | Sakai .......................... 713/201 |

OTHER PUBLICATIONS

Prasanna Ganesan et al., Yappers: a peer-to-peer lookup service over arbitrary topology, Mar. 30-Apr. 3, 2003, IEEE, 1250-1260.*
Annexstein et al., Indexing Techniques for File Sharing in Schalable Peer-to-Peer Networks, Oct. 14-16, 2002, IEEE, 10-15.*
Bo Ling et al., A Content-Based Resource Location Mechanism in PeerIS, Dec. 12-14, 2002, IEEE, 279-288.*

* cited by examiner

*Primary Examiner*—Jean B Fleurantin
(74) *Attorney, Agent, or Firm*—Rabin & Berdo, P.C.

(57) ABSTRACT

A searching method for a Security Policy Database (SPD) is proposed. The characteristic of peer gateway of the IPSec is applied to divide the original SPD into multiple smaller peer-based SPDs, and build a peer table corresponding to the peer-based SPDs. When it is required to search the policies in the database, the peer-based SPD according to the present invention can be directly used so as to save the time of data searching.

25 Claims, 13 Drawing Sheets

| peer identification | address | prefix | type |
|---|---|---|---|
| 1 | 203.56.77.33 | 32 | E |
| 1 | 140.96.0.0 | 16 | I |
| 2 | 207.52.79.40 | 32 | E |
| 2 | 140.112.0.0 | 16 | I |
| 0 | 0.0.0.0 | 0 | B |

FIG. 7

SEARCHING METHOD FOR A SECURITY POLICY DATABASE

BACKGROUND OF THE INVENTION

1. Field of the Invention

The present invention relates to Internet Protocol Security (IPSec), and particularly, to a searching method for a Security Policy Database (SPD).

2. Description of the Prior Art

The Virtual Private Network (VPN) applies the technology of the Internet Protocol (IP) to build the encryption tunneling on the Internet so as to establish the enterprise network on the Internet. The network based on the Internet protocol has good expandability, and applies the standard IPSec to be the protection technology. The IP security (IPSec, RFC 2401) combines the security standards of encryption, authentication, key management, digital certification, and so on so as to provide the high protection ability.

When the IPSec is applied for executing the data transmission, the processing can be inbound processing or outbound processing according to the direction of the data transmission. The inbound processing means that via the peer gateway, the data is transmitted from the peer network to the local gateway, and finally, to the local network. The packet received in the inbound processing is called as the inbound packet. There are two kinds of inbound packets. One is the inbound IPSec packet processed by the IPSec, and the other is the general inbound IP packet. The outbound processing means that via the local gateway, the data is transmitted from the local network to the peer gateway, and finally, to the peer network. The packet received by the outbound processing is called as the outbound packet, which is an outbound IP packet.

The IPSec has two different modes, the transport mode and the tunnel mode. The transport mode is a host-to-host encapsulation mechanism, and the tunnel mode is a gateway-to-gateway or gateway-to-host encapsulation. In order words, a host supporting the IPSec has to support the transport mode and the tunnel mode, while the gateway only has to support the tunnel mode. However, the gateway can also support the transport mode so as to provide another selection to make the gateway directly communicate with the host.

The IPSec will determine which packets have to be processed according to the designated selectors, such as the network address, the protocol, and the port number in the SPD. The processing methods comprise applying the IPSec, by-passing the IPSec and discarding. The default processing method is directly discarding the packet. Also, in order to apply the IPSec, the user has to designate the mode of the IPSec, the protocol of the IPSec, the authentication algorithm, the encryption/decryption algorithm, and the key in the Security Association Database (SAD).

The SPD is an ordered list composed of different security policies. Each of the policies is selected according to different selectors. The selectors include the source address, the destination address, the protocol, the source port and the destination port. The range value of each of the selectors can be single, range or wildcard.

Because the selectors may be the same, the overlapping of the policies easily occurs. Namely, in the SPD, the selectors of more than two policies may equally match the searching requirement of one packet. Therefore, IPSec requires the searching of the SPD to be ordered. The searching has to start from the beginning policy and go on sequentially until the first policy matching with the requirement is found so as to obtain a consistent searching result.

FIG. 1 is a perspective diagram of a prior art SPD. If the linear search is directly applied to be the searching method for SPD, the time complexity is O(n), and n is the number of the policies. For the system having a greater number of policies, applying the linear search on the SPD will become the processing bottleneck of the IPSec. Nowadays, the number of the policies in the business product specification is below 100 for the families or small scale enterprises, about 1000 for the middle/large scale enterprises, and about 10000 for the very large scale enterprises.

In the prior art, in order to resolve the problem of searching the SPD, three methods are provided. The first one is the brute force parallel searching method. The second one is the flow-based searching method (disclosed in the U.S. Pat. No. 6,347,376, and the US patent publication number 2003/0023846 and 2003/0069973). Please refer to FIG. 2. The third one is the Patricia-based searching method (disclosed in the U.S. Pat. No. 6,347,376 and the U.S. patent publication No. 2003/0061507). Please refer to FIG. 3.

The brute force parallel searching method directly utilizes the capability of the hardware parallel processing. It divides the number of the policies of the system specification by the maximum number of the policies capable of being processed by a single SPD module so as to determine the number of the SPD modules to be duplicated. The policy manager will collectively manage the searching requirements of the inbound packet or the outbound packet, and then broadcast the requirement to the inbound SPD modules, or the outbound SPD modules for simultaneously searching, and then get the searching result back. If policies matching with the requirement are found out from more than two SPDs, the policy manager will choose the policy with highest priority and report it.

The drawback of this method is the high cost because multiple SPD modules have to be duplicated, and at most, only two searching requirements of the SPDs can be served at the same time. One is the search for the inbound packets, and the other is the search for the outbound packets.

The flow-based searching method will perform some specific processes on each of the packet flow. Take the transport control protocol (TCP) packet for example, the packets having the same source address, destination address, protocol, source port and destination port belong to a packet flow. For the first packet of each of the packet flows, the linear search has to be performed on the SPD so as to obtain the corresponding policy. However, this method will store the search result for being used by the remaining packets in the same packet flow. If the search result is stored in a hash table of which the space usage rate is less than one half, theoretically, the time complexity is O(1).

However, the drawback of this method is that a great amount of memory space is required to maintain the hash table. The space complexity is O(f), and f is the number of packet flows. Furthermore, in this method, the linear search still has to be performed on the SPD for the first packet. Therefore, this may cause a period of delaying before the network program in the application layer builds the network connection.

The Patricia-based searching method applies the Patricia tree to search the data. The Patricia tree is a binary searching tree algorithm. The worst case of the Patricia tree having the non-contiguous masks is $O(w^2)$, and w is the length of the key of the Patricia tree. In the method disclosed in the U.S. patent publication number 2003/0061507, w is 112. The drawback of the Patricia-based searching method is that the policies in the SPD cannot be overlapped. Otherwise another effective algorithm is required to transform the original SPD into a non-ordered SPD so that the search result can match the required order by the IPSec. However, in the prior art, the method for transforming the security policy database into the non-ordered security policy database is not provided.

FIG. 4 is a flowchart for processing a prior art outbound IPSec. As for the outbound IP packet (S10), the search is performed on the security policy database (S12). If the search result is "discard," then the packet is directly discarded (S11). If the search result is "by-pass," then go to the process for the Internet protocol (S13). If the search result is "apply," then search the security association database (S15). If not found, then discard the packet, and build the security association (S14). If found, encapsulate the outer header (S16), and then perform the encryption and authentication (S17). Thereafter, go to the process for the Internet protocol (S13).

FIG. 5 is a flowchart for processing a prior art inbound IPSec. As for the inbound IPSec packet (S20), the search is performed on the security association database (S23). If not found (S22), then discard the packet. If found, perform the decryption and the authentication (S24), and then decapsulate the outer header (S25). Thereafter, the search is performed on the security policy database (S26). As for the inbound IP packet (S21), then directly search the security policy database (S26). If a wrong policy is found, then directly discard the packet (S22). If the correct policy is searched, then perform the process for the Internet protocol (S27).

SUMMARY OF THE INVENTION

The purpose of the present invention is to provide a searching method for a security policy database (SPD). According to one aspect of the present invention, the characteristic of peer gateway of the IPSec is applied to divide the original SPD into multiple smaller peer-based SPDs., and to build a peer table corresponding to the peer-based SPDs so as to save the time for policy searching.

According to another aspect of the present invention, when searching for the policy, the selector of the policy, such as the source address or the destination address, is used for searching the peer table. In the peer table, the policy matching to the selector is corresponding to a peer identification, and the peer identification is corresponding to the peer-based SPD.

According to another aspect of the present invention, the present invention can be applied in the inbound packet, which is the inbound IPSec packet processed by the IPSec or the general inbound IP packet. The present invention also can be applied in the outbound packet, which is the outbound IP packet.

According to another aspect of the present invention, the present invention can be applied for IPSec in tunnel mode, and also can support IPSec in transport mode.

According to another aspect of the present invention, the present invention can be used by combining other searching methods, e.g. the brute force parallel searching method and the flow-based searching method, so as to promote the searching effect.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings:

FIG. 7 is a perspective diagram of a peer table according to the present invention;

DETAILED DESCRIPTION OF THE PREFERRED EMBODIMENT

By means of the security gateway in tunnel mode, the embodiment of the present invention is described as follows.

An IPSec tunneling can be considered as a tunnel composed of an originating gateway and a terminating gateway. After the originating gateway performs the IPSec processing on the outbound packet transmitted out from the internal network/local area network (LAN), an outer header is added. The source address of the outer header is the address of the originating gateway, and the destination address is the address of the terminating gateway. At this time, the terminating gateway is the peer gateway of the originating gateway.

On the other hand, the terminating gateway will take the packet as an inbound packet to enter into its internal network/local area network (LAN). After the terminating gateway removes the protection mechanism of the IPSec, the restored packet will be transmitted to the exact destination host. At this time, the terminating gateway will take the originating gateway as its peer gateway.

Therefore, it is reasoned that in the outer header of the inbound IPSec packet, the source address is the address of the external network/wide area network (WAN) of the peer gateway, and in the header of the inbound IP packet, the source address is within the internal network/local area network (LAN) of the peer gateway. In the header of the outbound IP packet, the destination address is within the internal network/local area network (LAN) of the peer gateway.

Therefore, by properly using the relation between the peer gateway and the packet, a peer table is established, and peer-based Security Policy Databases are built for each of the peer gateways so as to increase the searching speed of the Security Policy Database.

Figure 6A:
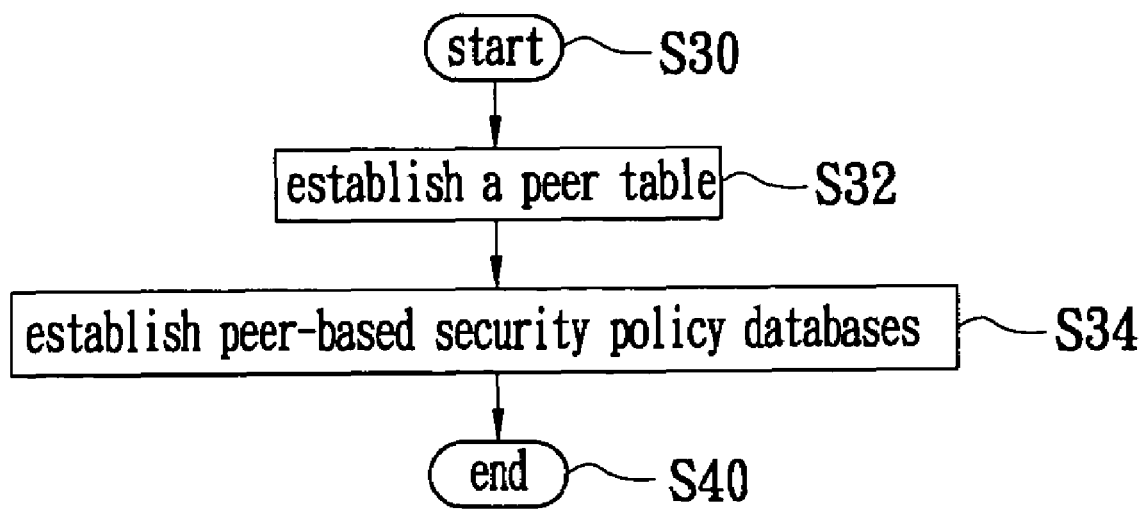
FIG. 6A is a flowchart for establishing peer-based Security Policy Databases according to the present invention.
Figure 6B:
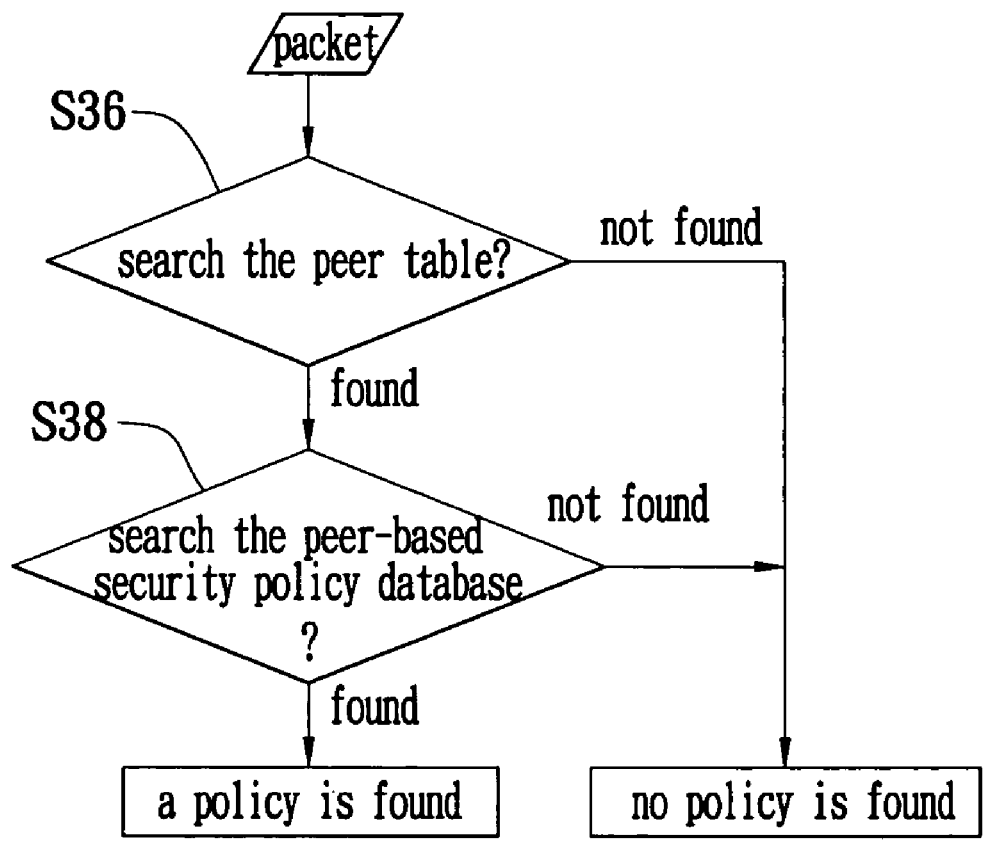
FIG. 6B is a flowchart to be performed when searching the security policy.

FIG. 6A is a flowchart for establishing peer-based Security Policy Databases according to the present invention. In step S30, the method is initiated (S30). First, a peer table is established (S32), and then according to each of the peer gateways in the peer table, an exclusive peer-based Security Policy Database is built (S34). FIG. 6B is a flowchart to be performed when searching the security policy. First, the peer table is searched (S36) so as to find out the corresponding peer-based Security Policy Database. Then, the peer-based Security Policy Databases is searched (S38) so as to find out the security policy. Finally, the method is terminated (S40).

FIG. 7 is a perspective diagram of a peer table according to the present invention. The peer table comprises the fields of peer identification, address, prefix, and type.

The peer identification is directed to the pointer of the corresponding peer-based Security Policy Database. The address is the internal network/local area network (LAN) section or the external network/wide area network (WAN) address. The prefix represents the number of bits in the address to be compared for finding out the matching address. There are three kinds of types. One is I (the internal network/local area network (LAN) section type), another is E (external network/wide area network (WAN) address type), and another is B (both). Take the IP version 4 (IPv4) for example, the length of the prefix corresponding to the external network/wide area network (WAN) address is 32, and the length of the prefix corresponding to the internal network/local area network (LAN) address is within the rang of 1 to 32 depending on the size of the network section. The length of the prefix of the external network address is equal to the number of the address bits.

Each of the peer gateways in the peer table comprises two data, the external network/wide area network (WAN) address and the internal network/local area network (LAN) section of the peer gateway, which are separately expressed by the address, the prefix and the type. In FIG. 7, as for the peer gateway of the peer identification 1, the external network/wide area network (WAN) address is 203.56.77.33, the internal network/local area network (LAN) section is 140.96.0.0, and the prefix is 16. Therefore, the range of internal network addresses of the peer gateway of the peer identification 1 is from 140.96.0.0 to 140.96.255.255. Similarly, as for the peer gateway of the peer identification 2, the external network/wide area network (WAN) address is 207.52.79.40, the internal network/local area network (LAN) section is 140.112.0.0, and the prefix is 16. Therefore, the range of internal network addresses of the peer gateway of the peer identification 2 is from 140.112.0.0 to 140.112.255.255. Furthermore, the peer gateway of the peer identification 0 is a default peer gateway to be used by the remaining packets corresponding to no peer gateways, and both of its address and prefix are 0, and the type is B.

Figure 8:
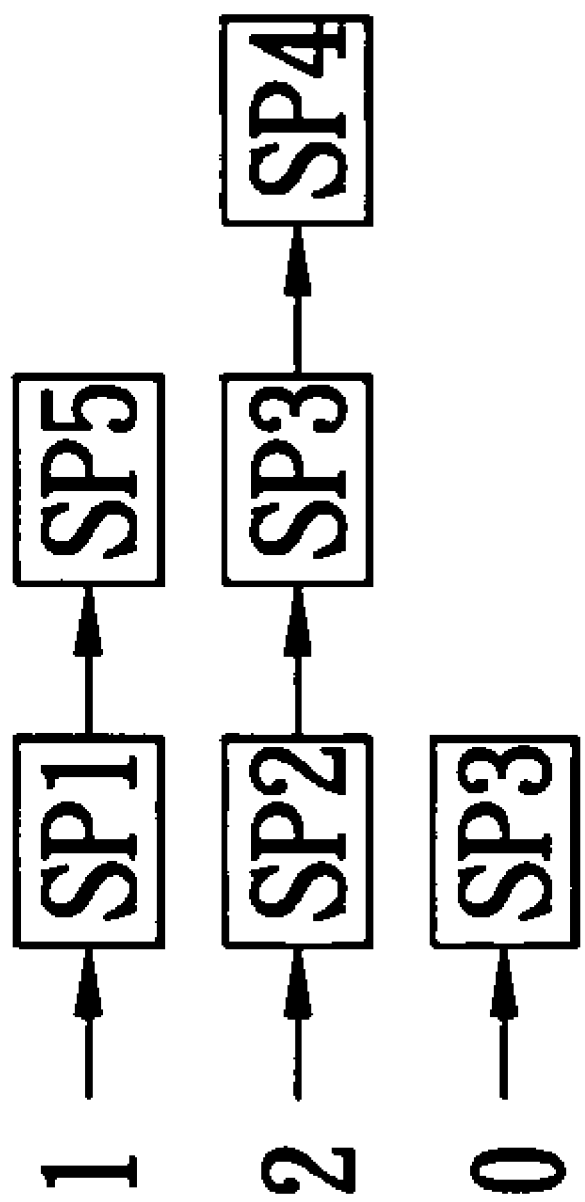
FIG. 8 is a perspective diagram of peer-based Security Policy Databases according to the present invention.

FIG. 8 is a perspective diagram of peer-based Security Policy Databases according to the present invention. An exclusive Security Policy Database, called as peer-based Security Policy Database, is built for each of the peer gateways, and is used for storing the security policy relating to the peer gateway. The default peer gateway also has an exclusive peer-based Security Policy Database for storing the "bypass" policy and the "discard" policy.

Figure 1:
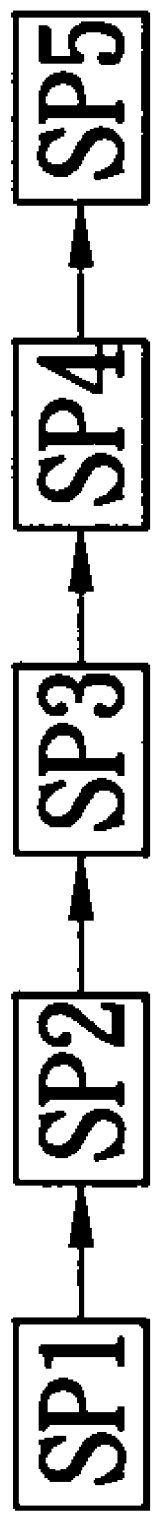
FIG. 1 is a perspective diagram of a prior art Security Policy Database.
Figure 2:
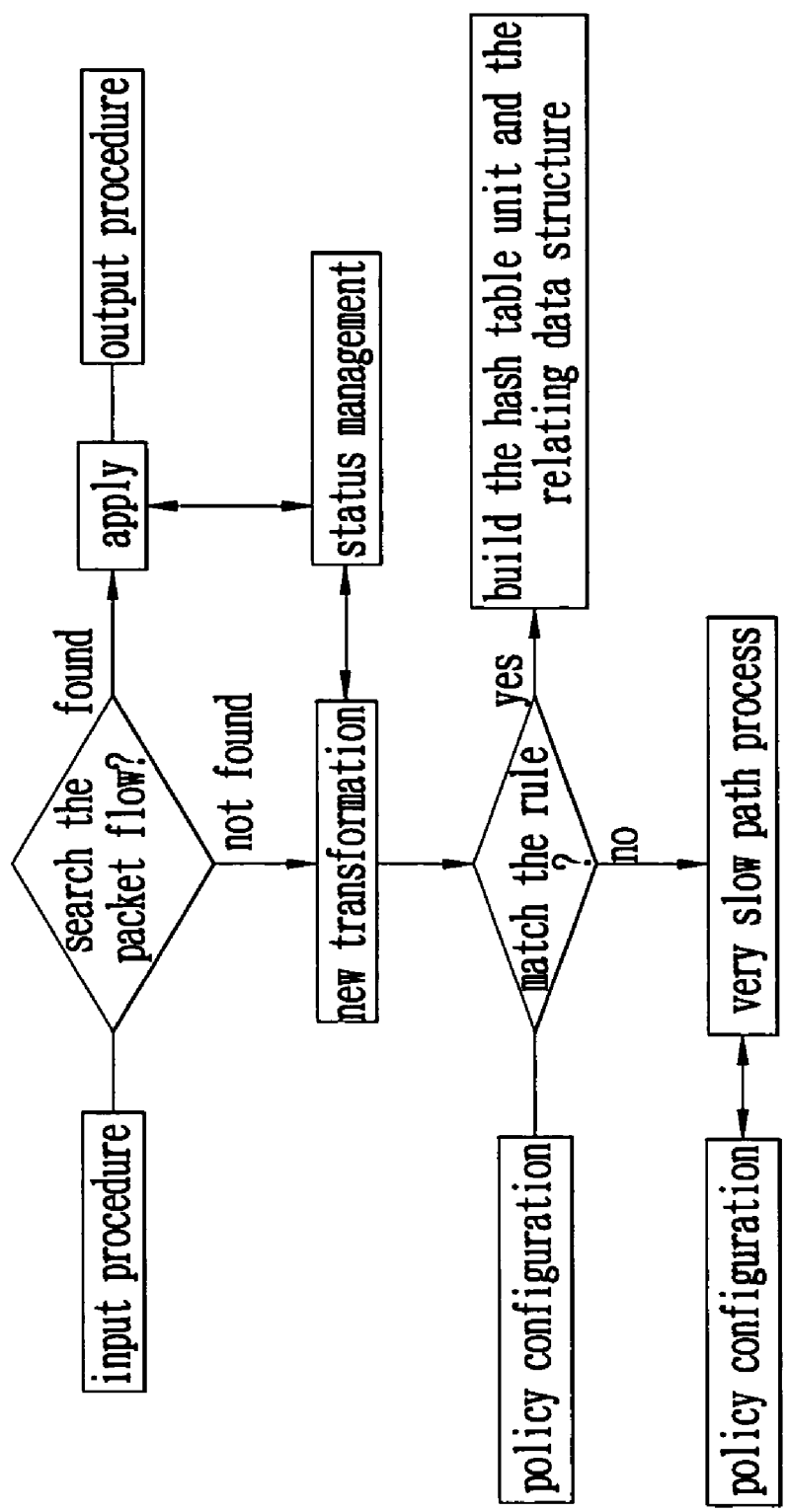
FIG. 2 is a perspective diagram of a prior art flow-based searching method.
Figure 3:
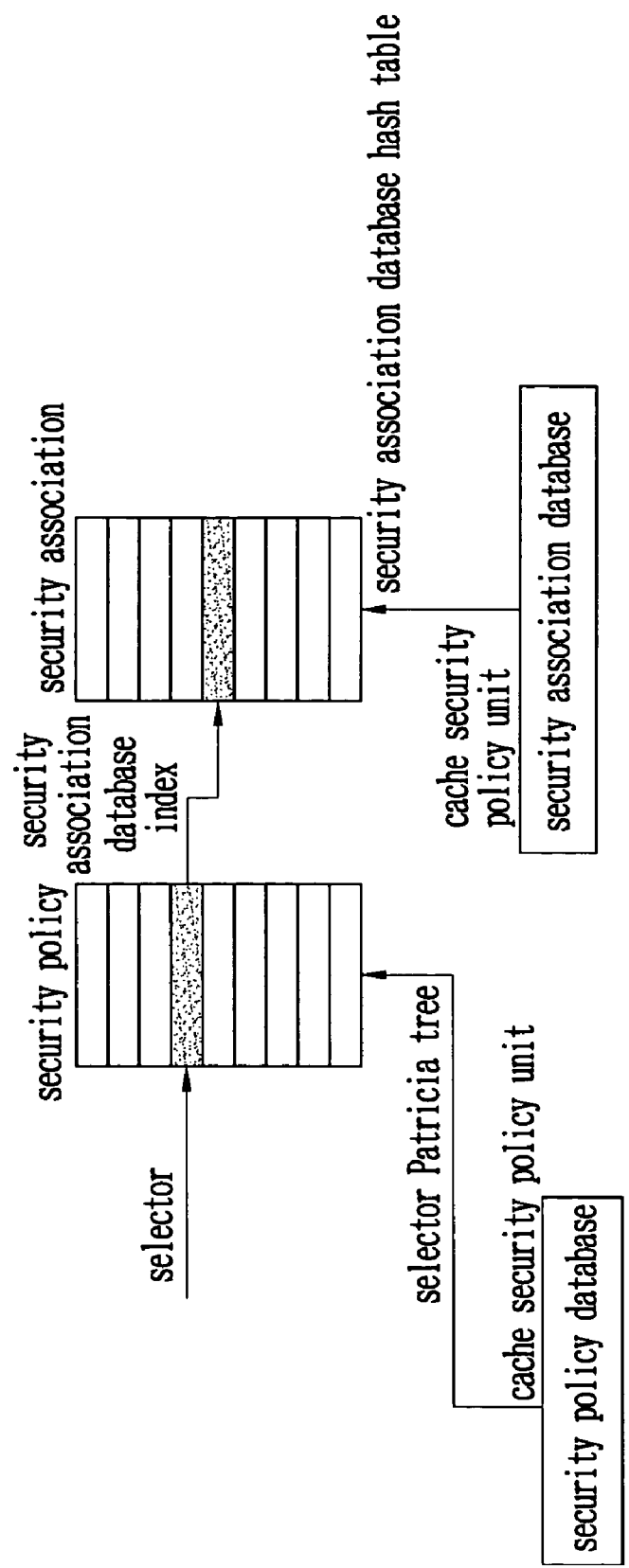
FIG. 3 is a perspective diagram of a prior art Patricia-based searching method.
Figure 4:
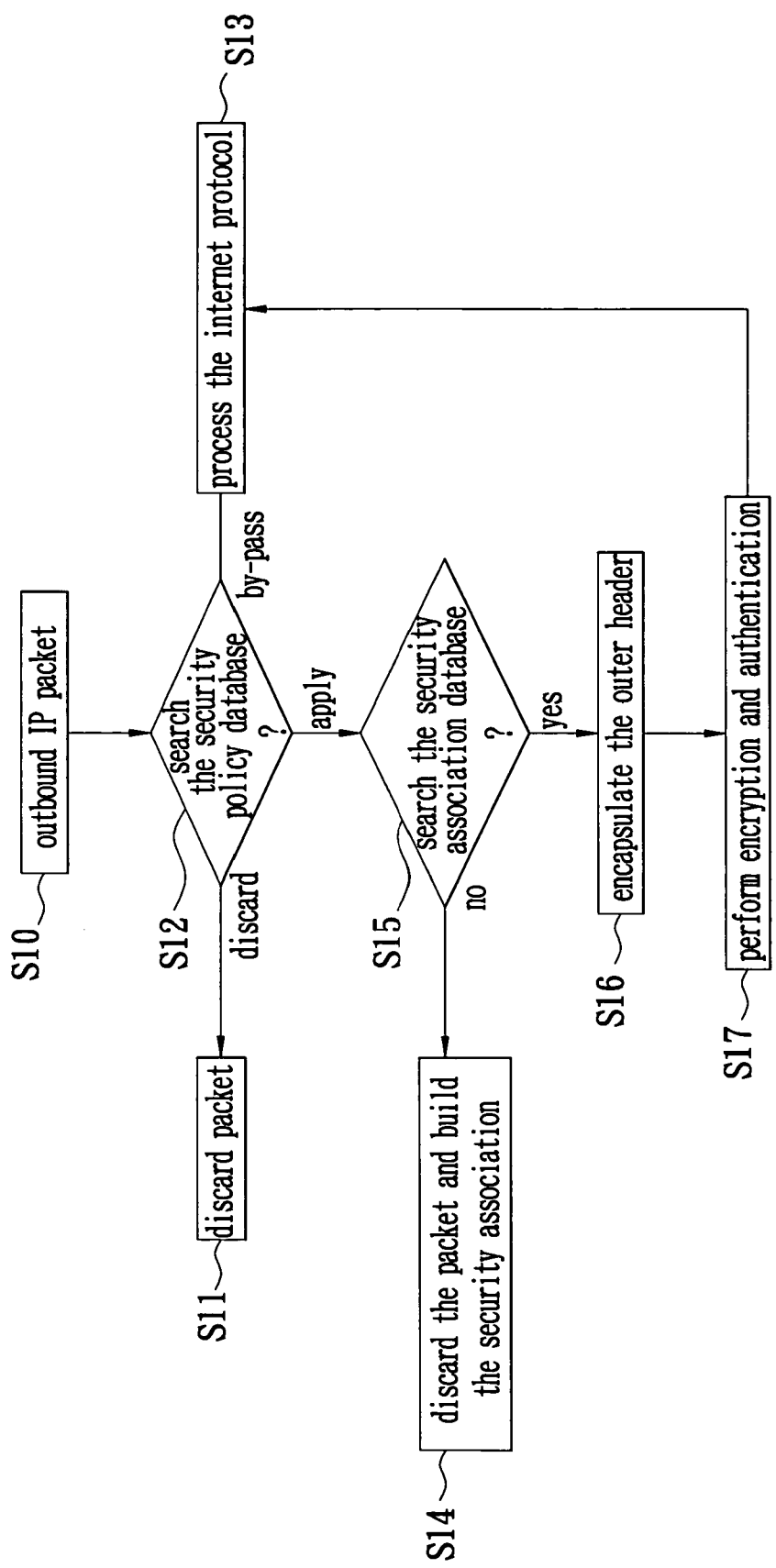
FIG. 4 is a flowchart for processing a prior art outbound IPSec.
Figure 5:
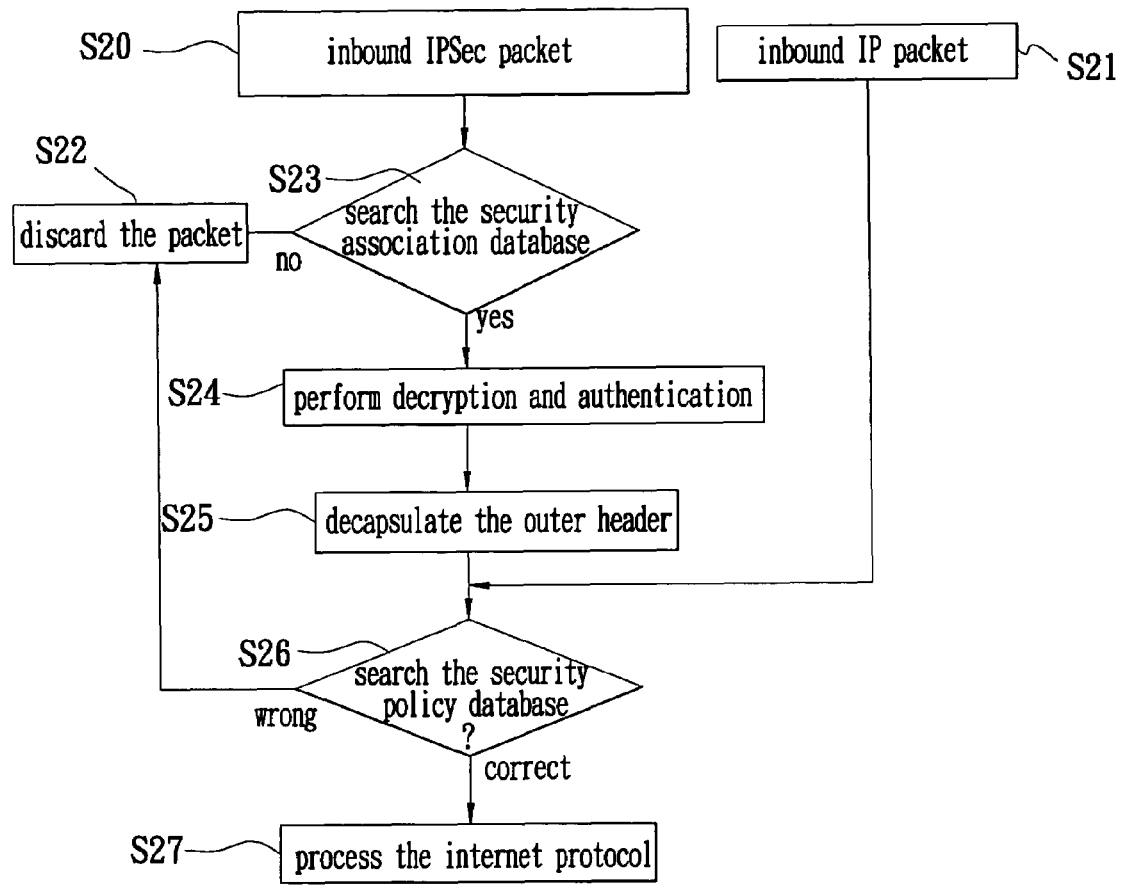
FIG. 5 is a flowchart for processing a prior art inbound IPSec.

In FIG. 1, the original Security Policy Database is linearly arranged. After the exclusive Security Policy Database is built for each of the peer gateways, as shown in FIG. 8, the security policies relating to the peer gateway of the peer identification 1 are 1 and 5, and the security policies relating to the peer gateway of the peer identification 2 are 2, 3 and 4, and the security policy relating to the peer gateway of the peer identification 0 is 3. These security policies suitable to different peer gateways are separately arranged in a linear way so as to form independent peer-based Security Policy Databases.

When the security policy in FIG. 1 is to be searched, it is searched from 1 to 5. If the security policy in FIG. 8 is to be searched, it is required to search the peer identification from the peer table, and then to search the corresponding peer-based Security Policy Database. Therefore, the number of the security policies to be searched will greatly decrease so as to save the searching time for the security policy.

When the user add a new policy in tunnel mode, the new policy will not only be added into the original Security Policy Database, but also added into the corresponding peer-based Security Policy Database if the new policy's peer gateway address is matching with the peer gateway address. The peer identification can be found out by searching the peer table's external network address. In order to maintain the policy order consistent with the original Security Policy Database, the source address or the destination address of the selectors of all of the newly-added policies have to be compared with the internal network/local area network (LAN) sections of other peer gateways so as to determine whether the overlapping occurs. If overlapped, the overlapped peer gateways have to add the new policy into its peer-based Security Policy Database. When the user wants to delete the policy, the user has to remove the data of the policy in the original Security Policy Database and in the peer-based Security Policy Database at the same time.

If the transport mode has to be supported at the same time, it is only required to take each of the peer hosts capable of directly communicating with the gateway as the peer gateway. First, at least one datum has to be built in the peer table for each of the peer hosts so as to store the network address of the peer host. The prefix is the same as the number of the address bits, and the type is B. Each of the peer host has an exclusive peer-based Security Policy Database established by using the above-mentioned way. Although in transport mode, the policy itself does not have the information for the peer gateway address, the policy will be within the peer-based Security Policy Database because of the overlapping between the destination address or the source address of the selector and the peer host address.

In transport mode, the searching methods for the inbound IP packet and the outbound IP packet are the same as those in tunnel mode. However, the searching method for the inbound IPSec packet in transport mode is different from that in tunnel mode.

The procedure for processing the inbound IPSec packet in tunnel mode, the procedure for processing the inbound IPSec packet in transport mode, the procedure for processing the inbound IP packet, and the procedure for processing the outbound IP packet are separately described as the follows.

Figure 9:
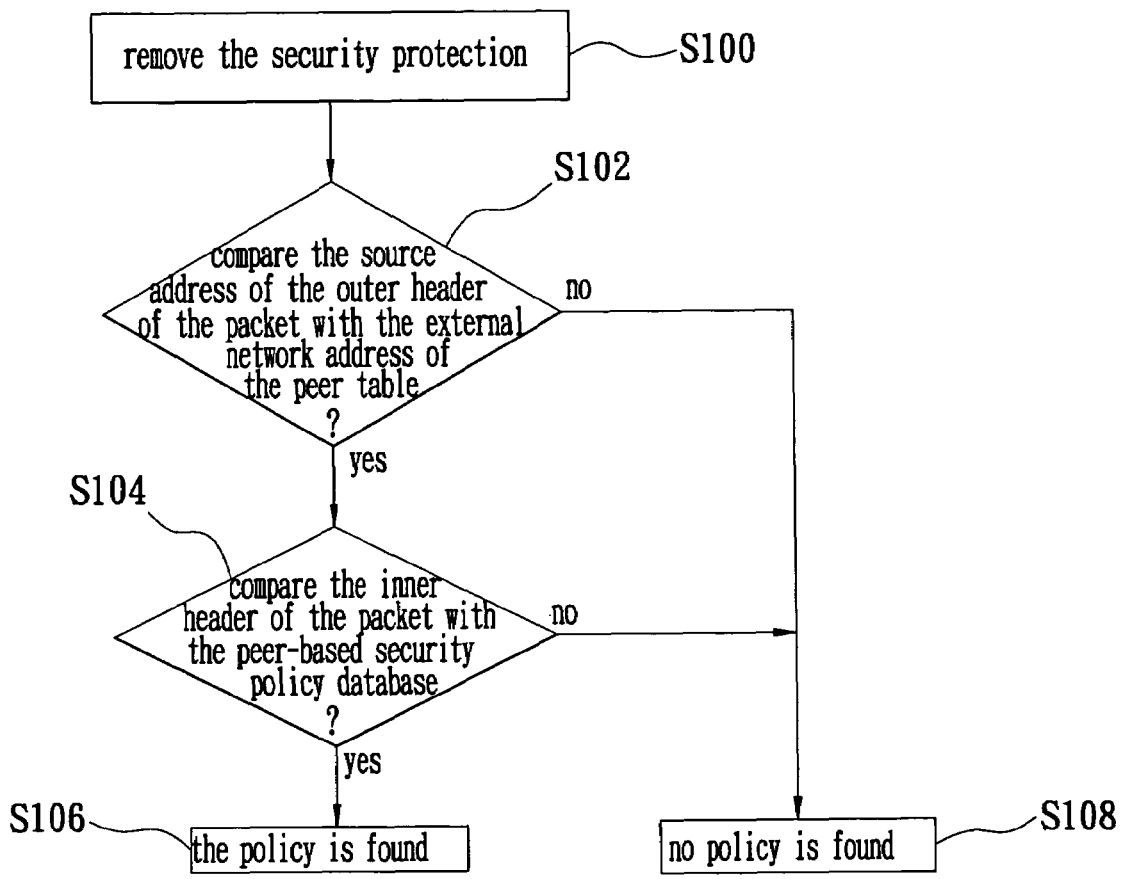
FIG. 9 is a flowchart for processing an inbound IPSec packet in tunnel mode according to the present invention.

FIG. 9 is a flowchart for processing an inbound IPSec packet in tunnel mode according to the present invention. As for the inbound IPSec packet, the first step is to remove the protection of the IPSec (S100). Then, the source address of the outer header of the inbound IPSec packet is compared with the external network/wide area network (WAN) address of the peer table (S102) so as to obtain the corresponding peer-based Security Policy Database. It not found, then no policy is found (S108). If found, the corresponding peer-based Security Policy Database is obtained. Therefore, the inner header of the inbound IPSec packet is compared with the policies in the peer-based Security Policy Database (S104) so as to obtain the policy matching with the condition or requirement. If the condition is matched, then the policy is found (S106). Otherwise, no policy is found (S108).

Figure 10:
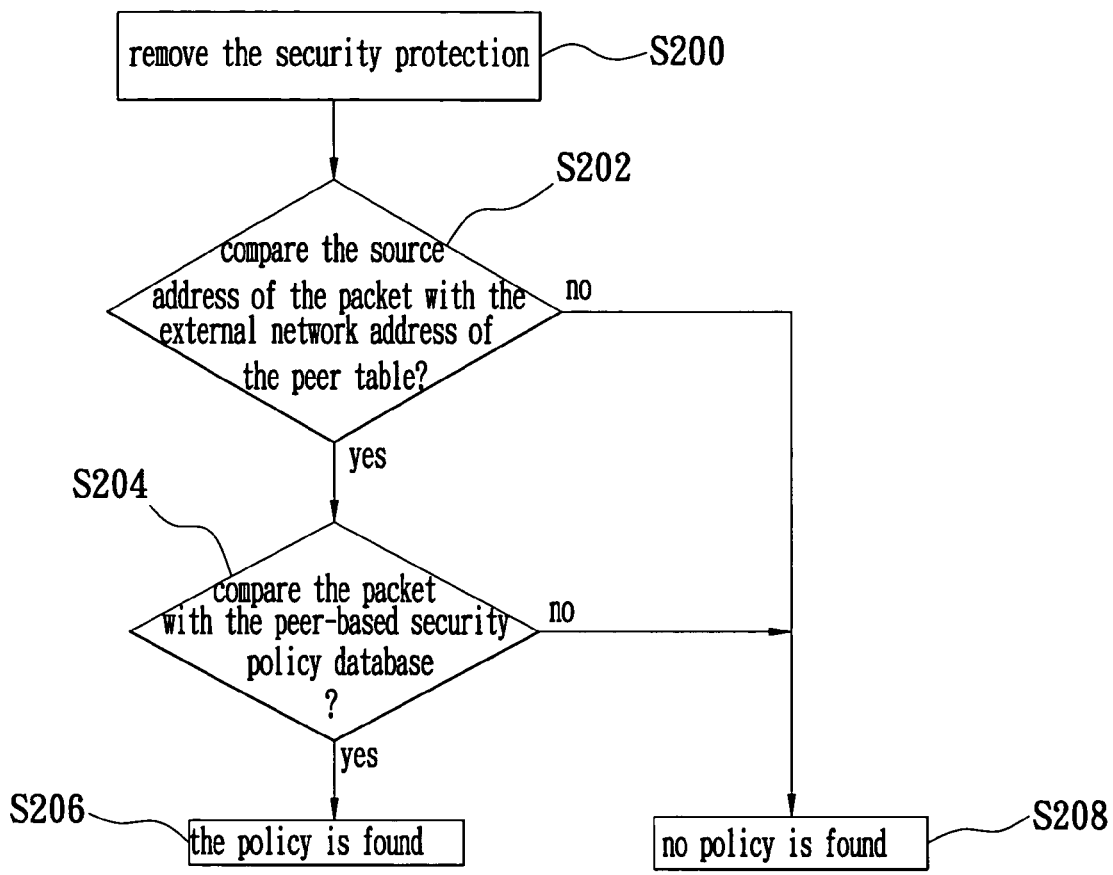
FIG. 10 is a flowchart for processing an inbound IPSec packet in transport mode according to the present invention.

FIG. 10 is a flowchart for processing an inbound IPSec packet in transport mode according to the present invention. As for the inbound IPSec packet, the first step is to remove the protection of the IPSec (S200). Then, the source address of the inbound IPSec packet is compared with the external network/wide area network (WAN) address of the peer table (S202) so as to obtain the corresponding peer-based Security Policy Database. If not found, no policy is found (S208). Otherwise, the corresponding peer-based Security Policy Database is obtained. Therefore, the inbound IPSec packet is compared with the policies in the peer-based Security Policy Database (S204) so as to obtain the policy matching with the condition. If the condition is matched, the certain policy is found (S206). Otherwise, no policy is found (S208).

Figure 11:
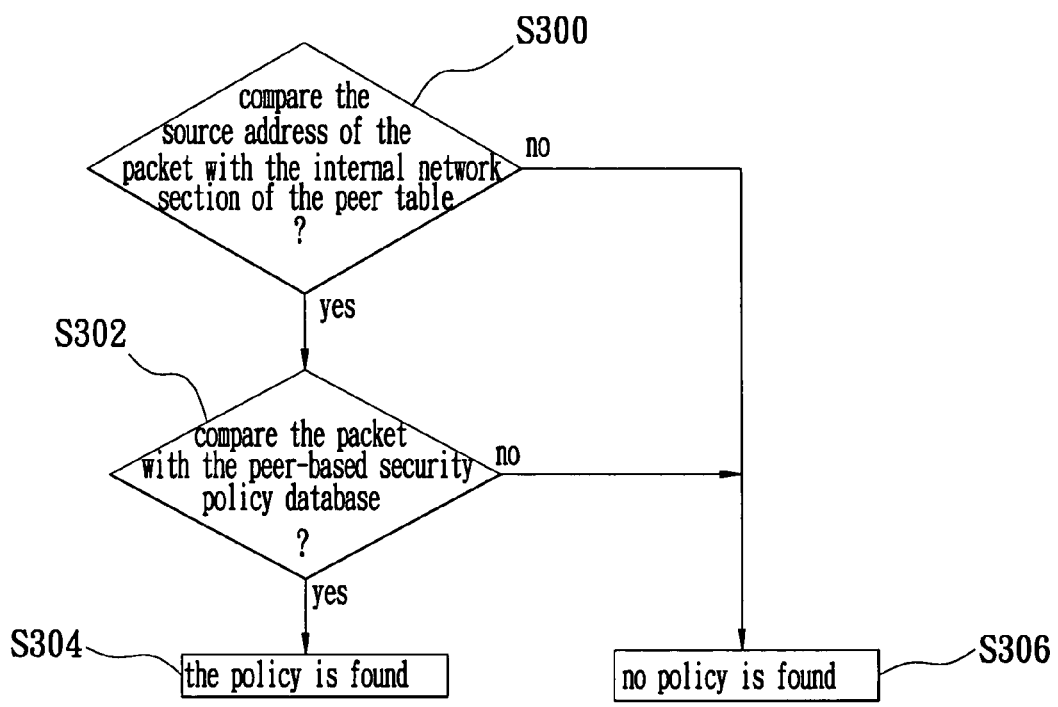
FIG. 11 is a flowchart for processing an inbound IP packet according to the present invention.

FIG. 11 is a flowchart for processing an inbound IP packet according to the present invention. The source address of the inbound IP packet is compared with the internal network/local area network (LAN) section of the peer table (S300) so as to obtain the corresponding peer-based Security Policy Database. If not found, no policy is found (S306). Otherwise, the corresponding peer-based Security Policy Database is obtained, and then the inbound IP packet is compared with the policies in the peer-based Security Policy Database (S302) so as to obtain the policy matching with the condition. If the condition is matched, the certain policy is found (S304). Otherwise, no policy is found (S306).

Figure 12:
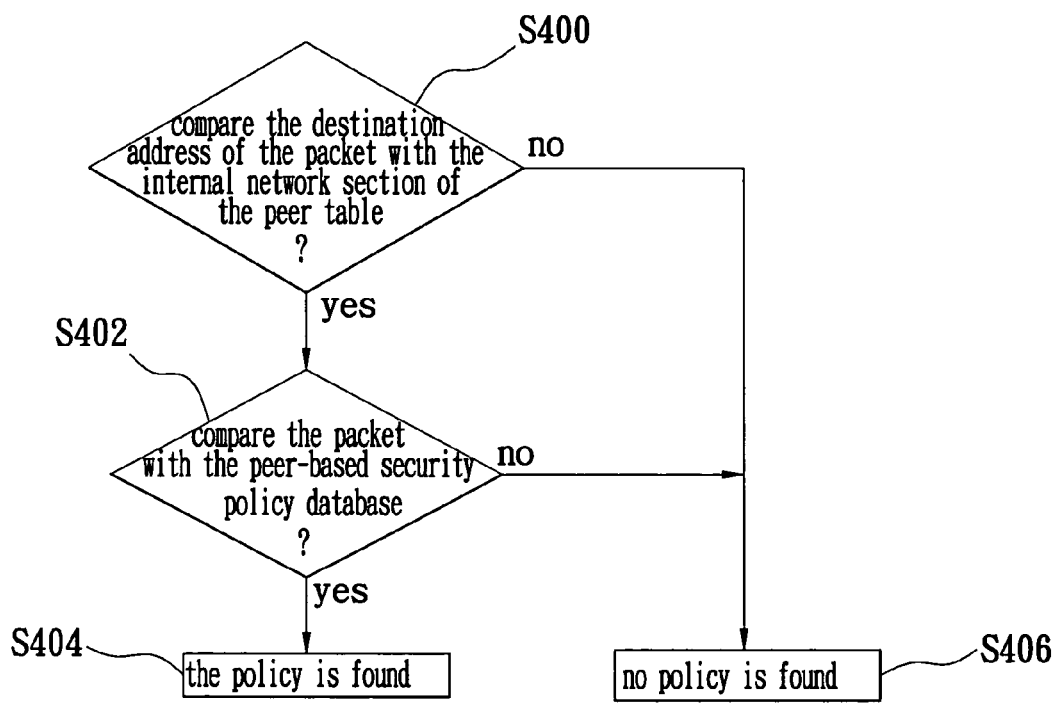
FIG. 12 is a flowchart for processing an outbound IP packet according to the present invention.

FIG. 12 is a flowchart for processing an outbound IP packet according to the present invention. First, the destination address of the outbound IP packet is compared with internal network/local area network (LAN) section of the peer table (S400) so as to obtain the corresponding peer-based Security Policy Database. If not found, then no policy is found (S406). If found, the corresponding peer-based Security Policy Database is obtained, and then the outbound IP packet is compared with the policies in the peer-based Security Policy Database (S402) so as to obtain the policy matching with the condition. If the condition is matched, the certain policy is found (S404). Otherwise, no policy is found (S406).

Furthermore, the present invention also can be combined with other improved SPD searching method, such as the brute force parallel searching method and the flow-based searching method. These two methods can be directly applied in all of the peer-based Security Policy Databases, or selectively applied in some of the peer-based Security Policy Databases, such the peer gateways with greater data flows.

When combined with the brute force parallel searching method, the inbound SPD and the outbound SPD are divided into multiple smaller inbound peer-based SPDs and multiple smaller outbound peer-based SPDs by using the provided method in the present invention. They are collectively managed by the policy manager, and the policy manager will transmit each of the searching requirement to the relating inbound peer-based SPDs or the relating outbound peer-based SPDs so as to performing the searching operation at the same time. Therefore, the searching requirements for the SPDs of the different peer gateways can be served at the same time so as to promote the system efficiency.

When combined with the flow-based searching method, the step of linearly searching the SPD for the first packet of each of the packet flows is replaced by the step of searching the peer-based Security Policy Database so as to decrease the delay caused by the searching.

Although the step of searching the peer gateway is further required in the present invention, the time complexity for searching the peer gateway is only O(1), no matter whether the hardware or software method is applied. Furthermore, by adding the step of searching the peer gateway, the average number of the policies in the peer-based Security Policy Database is 1/p of the original Security Policy Database, wherein p is the number of the peer gateways. Therefore, the time complexity for searching the Security Policy Database is reduced to be O(n/p) in the average case.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A searching method for a Security Policy Database comprising:
   building a peer table, wherein the peer table includes fields of peer identification, address, prefix, and type;
   building a set of peer-based Security Policy Databases composed of a plurality of peer-based Security Policy Databases;
   searching the peer table to locate a Security Policy Database within the set of peer-based Security Policy Databases by comparing the set of peer-based Security Policy Databases with the field of address of the peer table so as to obtain a corresponding peer-based Security Policy Database; and
   searching the corresponding peer-based Security Policy Database so as to obtain a security policy;
   wherein the step of building a peer table further comprises the step of building data in the peer table according to a default peer gateway; the data comprises the peer identification, the address, the type and the prefix; and the peer identification is 0, the address is 0, and the prefix is 0.

2. The searching method of claim 1, wherein the step of building a peer table further comprises the step of building at least two data in the peer table according to a peer gateway; according to one set of peer gateway, at least two sets of data are built in the peer table.

3. The searching method of claim 2, wherein one of the two data is an internal network/local area network (LAN) data, the other is an external network/wide area network (WAN) data; one of the two sets of data is a set of internal network/local area network (LAN) data and the other is a set of external network/wide area network (WAN) data.

4. The searching method of claim 3, wherein each of the internal network/local area network (LAN) data and the external network/wide area network (WAN) data comprises a peer identification, an address, a type and a prefix; the peer identification represents the peer gateway; the address is a network address; the type is an internal network/local area network (LAN) section type, an external network/wide area network (WAN) address type or both; the prefix is the number of the bits for comparing the address.

5. The searching method of claim 4, the address included in the internal network/local area network (LAN) data is an internal network/local area network (LAN) section.

6. The searching method of claim 4, the address included in the external network/wide area network (WAN) data is an external network/wide area network (WAN) address.

7. The searching method of claim 1, wherein, in the step of building data in the peer table according to the default peer gateway, the type of the data is B, and the type B is defined as both an internal network/local area network (LAN) section type and an external network/wide area network (WAN) address type.

8. The searching method of claim 1, wherein the step of building a set of peer-based Security Policy Database further comprises the step of building a peer-based Security Policy Database according to a peer gateway for storing a security policy relating to the peer gateway; according to a plurality of peer gateways, a plurality of peer-based Security Policy Databases are built.

9. The searching method of claim 1, wherein the step of building a set of peer-based Security Policy Database further comprises a step of building a default peer-based Security Policy Database according to a default peer gateway for storing the security policy relating to the default peer gateway.

10. The searching method of claim 8, wherein the step of building the peer-based Security Policy Database according to a peer gateway is according to a selector of a security policy, and the selector is a source address or a destination address.

11. The searching method of claim 9, the security policy relating to the default peer gateway is a by-pass security policy or a discard security policy.

12. The searching method of claim 1, wherein step of building a set of peer-based Security Policy Database further comprises a method for adding-in a security policy, the method comprises:
adding the security policy in the set of peer-based Security Policy Database according to a selector.

13. The searching method of claim 12, wherein the selector is a source address or destination address.

14. The searching method of claim 1, wherein the step of building a set of peer-based Security Policy Database further comprises a method for deleting a security policy, the method comprises:
deleting the security policy from the set of peer-based Security Policy Database according to a selector.

15. The searching method of claim 14, wherein the selector is a source address or destination address.

16. The searching method of claim 1, wherein the step of searching the peer table further comprises a step of comparing a packet and the peer table.

17. The searching method of claim 16, wherein the packet is an inbound IPsec packet in tunnel mode; the comparing step is used for comparing the source address of the outer header of the inbound IPsec packet in tunnel mode and the external network/wide area network (WAN) address of the peer table.

18. The searching method of claim 16, wherein the packet is an inbound IPsec packet in transport mode; the comparing step is used for comparing the source address of the inbound IPsec packet in transport mode and the external network/wide area network (WAN) address of the peer table.

19. The searching method of claim 16, wherein the packet is an inbound IP packet; the comparing step is used for comparing the source address of the inbound IP packet with the internal network/local area network (LAN) section of the peer table.

20. The searching method of claim 16, wherein the packet is an outbound IP packet; the comparing step is used for comparing the destination address of the outbound IP packet with the internal network/local area network (LAN) section of the peer table.

21. The searching method of claim 1, wherein the step of searching the peer-based Security Policy Database comprises a step for comparing a packet and the peer-based Security Policy Database.

22. The searching method of claim 21, wherein the packet is an inbound IPsec packet in tunnel mode; the comparing step is used for comparing the inner header of the inbound IPsec packet in tunnel mode with the selector of the security policy of the peer-based Security Policy Database.

23. The searching method of claim 21, wherein the packet is an inbound IPsec packet in transport model; the comparing step is used for comparing the header of the inbound IPsec packet in transport mode with the selector of the security policy of the peer-based Security Policy Database.

24. The searching method of claim 21, wherein the packet is an inbound IP packet; the comparing step is used for comparing the header of the inbound IP packet with the selector of the security policy of the peer-based Security Policy Database.

25. The searching method of claim 21, wherein the packet is an outbound IP packet; the comparing step is used for comparing the header of the outbound IP packet with the selector of the security policy of the peer-based Security Policy Database.

* * * * *